US010865869B2

(12) United States Patent
Paul et al.

(10) Patent No.: US 10,865,869 B2
(45) Date of Patent: Dec. 15, 2020

(54) WORM DRIVE

(71) Applicant: Dr. Ing. h.c. F. Porsche Aktiengesellschaft, Stuttgart (DE)

(72) Inventors: Joachim Paul, Benningen a.N. (DE); Johannes Toepfl, Feldkirch (AT)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 89 days.

(21) Appl. No.: 15/727,641

(22) Filed: Oct. 9, 2017

(65) Prior Publication Data

US 2018/0112763 A1 Apr. 26, 2018

(30) Foreign Application Priority Data

Oct. 25, 2016 (DE) ........................ 10 2016 120 357

(51) Int. Cl.

*F16H 55/24* (2006.01)
*F16C 27/02* (2006.01)
*F16H 1/16* (2006.01)
*F16C 27/08* (2006.01)
*F16H 57/021* (2012.01)

(52) U.S. Cl.

CPC ............. *F16H 55/24* (2013.01); *F16C 27/02* (2013.01); *F16C 27/08* (2013.01); *F16H 1/16* (2013.01); *F16H 1/166* (2013.01); *F16C 2361/61* (2013.01); *F16C 2380/27* (2013.01); *F16H 2057/0213* (2013.01)

(58) Field of Classification Search

CPC .......... F16H 55/18; F16H 55/24; F16H 57/12; F16H 2057/126; F16H 2057/127; F16H 2057/0213; F16H 1/203; F16C 27/08; F16F 1/32

USPC .................................................... 74/425, 427

See application file for complete search history.

(56) References Cited

U.S. PATENT DOCUMENTS 3,080,160 A * 3/1963 Orner ........................ F16F 1/32 267/160
4,026,163 A * 5/1977 Merkert .................... F16H 1/16 74/425
4,282,767 A * 8/1981 Guichard ................ F16H 1/225 74/410
4,398,135 A * 8/1983 Busch ....................... B60S 1/08 310/239
4,524,643 A * 6/1985 Ziegler ................. F16H 1/2836 475/345

(Continued)

FOREIGN PATENT DOCUMENTS

CN 203027078 U * 6/2013
CN 203272719 U 11/2013

(Continued)

*Primary Examiner* — William Kelleher
*Assistant Examiner* — T. Scott Fix
(74) *Attorney, Agent, or Firm* — Leydig, Voit & Mayer, Ltd.

(57) ABSTRACT

A worm drive includes a rotatably mounted worm shaft, and a device for compensating an unwanted axial backlash of the worm shaft. The device for compensating the unwanted axial backlash of the worm shaft includes two pressure bodies between which the worm shaft is clamped in the axial direction by a diaphragm spring device. The diaphragm spring is assigned to one of the pressure bodies.

12 Claims, 1 Drawing Sheet

16 15 14 40 18 30 20 26 19 25 12 11 10

(56) References Cited

U.S. PATENT DOCUMENTS 4,615,230 A * 10/1986 Guichard ................ F16H 1/225 310/83
4,796,479 A * 1/1989 Wisecarver ............... F16H 1/16 192/20
4,852,706 A * 8/1989 Pietrzak ................ F16D 43/216 192/223.1
4,885,950 A * 12/1989 Smith ..................... F16H 57/12 74/409
5,212,999 A * 5/1993 Kitada .................... F16C 21/00 74/425
5,570,606 A * 11/1996 Irie ......................... F16H 1/203 74/425
5,605,071 A 2/1997 Buchanan, Jr.
6,523,431 B2 * 2/2003 Ozsoylu ............... B62D 5/0409 74/388 PS
7,177,744 B2 * 2/2007 Tanaka ................. B62D 5/0409 180/444
10,240,663 B2 * 3/2019 Nickel .................. E05F 15/611
10,670,114 B2 * 6/2020 Herrmann ............... F16H 1/203
2002/0148315 A1 10/2002 Mittendorf et al.
2002/0195893 A1 * 12/2002 Kobayashi ........... B62D 5/0409 310/83
2004/0075353 A1 * 4/2004 Walther ................ F16C 25/083 310/90
2007/0102228 A1 * 5/2007 Shiina .................. B62D 5/0409 180/444
2009/0255751 A1 * 10/2009 Kondo ................. B62D 5/0409 180/444
2010/0206111 A1 8/2010 Keller et al.
2015/0076838 A1 * 3/2015 Rajagopal ............... E05B 81/06 292/201
2015/0226315 A1 * 8/2015 Iizuka .................... B62D 3/126 74/409
2015/0276047 A1 * 10/2015 Kimijima .................. F16H 1/16 74/409

FOREIGN PATENT DOCUMENTS

DE 9400232 U1 3/1994
DE 29513699 U1 9/1996
DE 102007038916 A1 2/2009
DE 102008042609 A1 4/2010
EP 1623908 B1 2/2006
JP 2007247734 A 9/2007

* cited by examiner

WORM DRIVE

CROSS REFERENCE TO RELATED APPLICATIONS

This application claims benefit to German Patent Application No. DE 10 2016 120 357.2, filed Oct. 25, 2016, which is hereby incorporated by reference herein.

FIELD

The invention relates to a worm drive having a rotatably mounted worm shaft, and having a device for compensating an unwanted axial backlash of the worm shaft.

BACKGROUND

German Utility Model DE 29 513 699 U1 discloses an arrangement for setting the axial backlash of a shaft, supported in sliding bearings, of a low-power motor drive, having a disk-shaped thrust part in front of the end face of one shaft end, wherein an elastic disk-shaped thrust part is pressed against each of the two end faces, said thrust part having a deformation spring characteristic such that the contact force is low and substantially constant when there is an axial backlash movement of the shaft in one or the other direction within the maximum axial backlash but increases in such a way as to form an inelastic stop limit when the maximum axial backlash is reached. European Patent EP 16 239 08 B1 discloses an electric power steering device, wherein two shaft parts are enclosed by two circular elastic bodies, e.g. diaphragm springs, in order to suppress movement in the axial direction. US Patent Application US 2002/0148315 A1 discloses a speed reducer, which has a worm drive that is surrounded by a spring device, e.g. a diaphragm spring, in order to exert a constant pressure on a gear. German Laid-Open Application DE 10 2008 042 609 A1 discloses a bearing arrangement for a worm in a steering gear, wherein the bearing arrangement has a fixed bearing comprising an outer ring, an inner ring and rolling elements mounted movably between said rings, wherein a spring element is provided, which imposes an axially acting force on the inner ring of the fixed bearing, wherein the spring element can be designed as a diaphragm spring. German Utility Model DE 94 00 232 U1 discloses a worm drive having a housing in which a worm shaft, which can be subjected to a lifting load at one end and is in engagement with a worm gear that can be driven, in particular by a three-phase asynchronous motor, is supported by two radial rolling bearings, which are preloaded by means of diaphragm springs. U.S. Pat. No. 5,605,071 discloses a worm drive which is centered axially by means of spring forces acting on a bearing.

SUMMARY

In an embodiment, the present invention provides a worm drive. The worm drive includes a rotatably mounted worm shaft, and a device for compensating an unwanted axial backlash of the worm shaft. The device for compensating the unwanted axial backlash of the worm shaft includes two pressure bodies between which the worm shaft is clamped in the axial direction by a diaphragm spring device. The diaphragm spring device is assigned to one of the pressure bodies.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
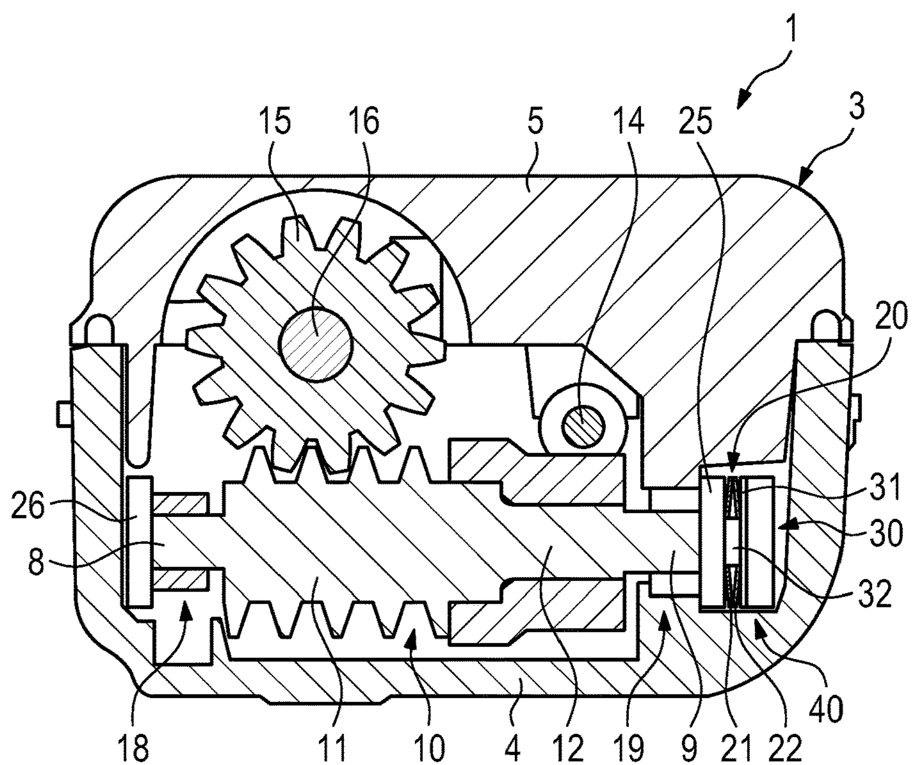
FIG. 1 shows a worm drive having a rotatably mounted worm shaft and having a device for compensating an unwanted axial backlash of the worm shaft in longitudinal section.

Embodiments of the present invention provide worm drives having a rotatably mounted worm shaft and a device for compensating an unwanted axial backlash of the worm shaft, the worm drives being of simple construction and capable of being produced at low cost.

According to an embodiment, the present invention provides a worm drive having a rotatably mounted worm shaft and a device for compensating an unwanted axial backlash of the worm shaft. The device for compensating the unwanted axial backlash of the worm shaft has two pressure bodies, between which the worm shaft is clamped in the axial direction by a diaphragm spring device, which is assigned to one of the pressure bodies. The pressure bodies are formed as pressure plates composed of a very hard steel material, for example. With the aid of the diaphragm spring device, the worm shaft can be clamped in a stable manner between the two pressure bodies, wherein the diaphragm spring device compensates an unwanted axial backlash, which can be caused by thermal expansions, manufacturing tolerances, loads imposed by forces or torques, for example.

A preferred illustrative embodiment of the worm drive is characterized in that the pressure body to which the diaphragm spring device is assigned is arranged between the diaphragm spring device and one shaft end of the worm shaft. The two shaft ends of the worm shaft are preferably each assigned to one of the pressure bodies. Moreover, the two shaft ends of the worm shaft are advantageously supported in a housing of the worm drive with the aid of suitable bearing devices. The pressure bodies are positioned in a stable manner in the housing of the worm drive, e.g. by means of corresponding recesses and/or ribs in the interior of the housing.

Another preferred illustrative embodiment of the worm drive is characterized in that the pressure bodies are embodied as pressure plates. The pressure plates are preferably formed from a very hard steel material.

Another preferred illustrative embodiment of the worm drive is characterized in that the diaphragm spring device comprises one, two or even four diaphragm springs. The two diaphragm springs are preferably arranged in opposite directions.

Another preferred illustrative embodiment of the worm drive is characterized in that the worm drive is embodied as a double worm drive, wherein the worm shaft has two axial sections with different tooth systems. It is advantageous if the double worm drive comprises two worm shafts. The abovementioned worm shaft advantageously forms an intermediate shaft in the double worm drive. Via a first worm shaft, which is also referred to as a drive shaft, a torque can be introduced from an electric motor into the second worm shaft, which is referred to as an intermediate shaft and to which the device for compensating the unwanted axial backlash is assigned.

Another preferred illustrative embodiment of the worm drive is characterized in that the worm shaft is rotatably mounted at its shaft ends facing the pressure bodies. Sliding bearings are used to support the worm shaft, for example.

Another preferred illustrative embodiment of the worm drive is characterized in that the diaphragm spring device is combined with a spring holder, which has an axial stop body for the diaphragm spring device. It is advantageous if the diaphragm spring device is clamped in the axial direction between the pressure body assigned thereto and the stop body of the spring holder.

Another preferred illustrative embodiment of the worm drive is characterized in that the spring holder comprises a spacer, which extends through the diaphragm spring device from the stop body and, with its free end, forms a stop for the pressure body to which the diaphragm spring device is assigned. Through appropriate axial dimensioning of the spacer, it is possible to prevent the diaphragm spring device from being subjected to excess pressure or forming a solid block.

Embodiments of the present invention further provide adjusting devices having a worm drive described above. The adjusting devices can be used, for example, to adjust a device on a motor vehicle, e.g. an aerodynamic device, also referred to as a spoiler. To drive the adjusting device, it is advantageous to use an electric motor. Embodiments of the invention further provide a motor vehicle having an adjusting device of this kind.

Figure 2:
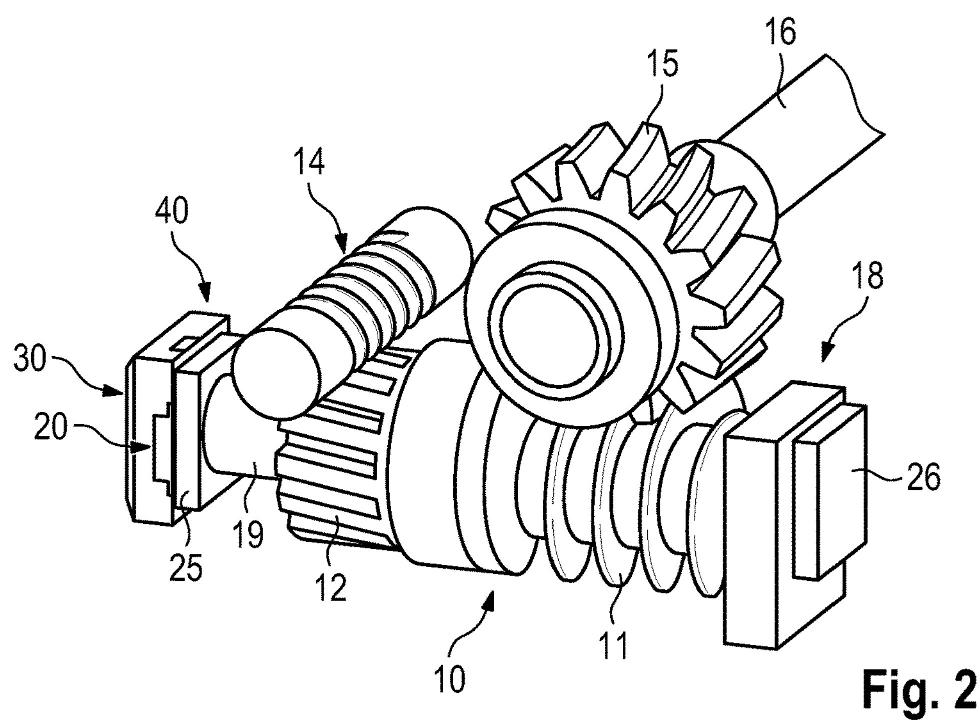
FIG. 2 shows a perspective illustration of the worm drive from FIG. 1 without the housing.

In FIGS. 1 and 2, a worm drive 1 is illustrated in section and in perspective. As can be seen in FIG. 1, the worm drive 1 comprises a housing 3 having a lower part 4 and an upper part 5.

The worm drive 1 comprises a worm shaft 10 having two shaft ends 8, 9. The worm shaft 10 comprises a worm shaft tooth system in a first axial section 11. In a second axial section 12, the worm shaft 10 is provided with a worm gear tooth system.

The worm drive 1 is embodied as a double worm drive having a drive shaft 14. The drive shaft 14 is embodied as a worm shaft and is arranged perpendicularly to the worm shaft 10. The drive shaft 14 embodied as a worm shaft is in engagement with the worm gear tooth system in the second section 12 of the worm shaft 10.

The worm shaft tooth system in the first section 11 of the worm shaft 10 is in engagement with a worm gear 15, which is mounted on an output shaft 16 of the double worm drive 1. The output shaft 16 of the double worm drive 1 is arranged perpendicularly to the worm shaft 10 and parallel to the drive shaft 14.

The worm shaft 10 is rotatably mounted in the housing 3 at its shaft ends 8, 9 with the aid of two bearing devices 18, 19, which are embodied as sliding bearings for example. In the double worm drive 1, the worm shaft 10 is assigned a device 40 for compensating an unwanted axial backlash.

The device 40 for axial backlash compensation comprises a diaphragm spring device 20 having two diaphragm springs 21, 22. The two diaphragm springs 21, 22 are arranged in series and serve to apply an axial preload to the worm shaft 10, which forms an intermediate shaft between the drive shaft 14 and the output shaft 16 in the double worm drive 1.

The device 40 for axial backlash compensation furthermore comprises two pressure bodies 25, 26. The pressure bodies 25, 26 are formed as pressure plates composed of a very hard steel material.

By means of its shaft end 8, the worm shaft or intermediate shaft 10 rests against pressure body 26. By means of its shaft end 9, the intermediate shaft or worm shaft 10 rests against pressure body 25. Pressure body 25 is clamped between shaft end 9 and the diaphragm spring device 20 in the axial direction.

The device 40 for axial backlash compensation furthermore comprises a spring holder 30 for the diaphragm spring device 20. The spring holder 30 comprises a stop body 31, on which the diaphragm spring device 20 is supported in the axial direction. In the spring holder 30, the diaphragm spring device 20 is arranged between the stop body 31 and pressure body 25.

The spring holder 30 furthermore comprises a spacer 32, which starts from the stop body 31 and a free end of which faces pressure body 25. The spacer 32 extends through the diaphragm springs 21, 22 of the diaphragm spring device 20 and prevents the diaphragm springs 21, 22 from being subjected to unwanted excess pressure.

In normal operation of the axial backlash compensation device 40, the free end of the spacer 32 is spaced apart from pressure body 25 in the axial direction. When the free end of the spacer 32 strikes against pressure body 25, the diaphragm springs 21, 22 are protected from excess pressure for cases where they form a block.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A worm drive comprising:

a rotatably mounted worm shaft, and a device for compensating an axial backlash of the worm shaft, wherein the device for compensating the axial backlash of the worm shaft includes two pressure bodies between which the worm shaft is clamped in the axial direction by a diaphragm spring device, wherein the diaphragm spring device is assigned to one of the pressure bodies, wherein each of the shaft ends has a surface that abuts a surface of a respective one of the pressure bodies, wherein the respective surface of each of the shaft ends is at a respective one of the outermost portions of the worm shaft in the axial direction, wherein a force is applied by each of the pressure bodies on the respective surface of the shaft ends, wherein the worm drive is a double worm drive, and wherein the worm shaft has two axial sections with different tooth systems, where the two axial sections are between shaft ends of the worm shaft, wherein the tooth system of a first axial section of the two axial sections couples with a drive shaft, and the tooth system of a second axial section of the two axial sections couples with a worm gear, wherein the worm shaft is an intermediate shaft in the double worm drive, and wherein the drive shaft is configured to be coupled to a motor to deliver torque to the intermediate shaft.

2. The worm drive as claimed in claim 1, wherein the pressure body to which the diaphragm spring device is assigned is arranged between the diaphragm spring device and one shaft end of the worm shaft.

3. The worm drive as claimed in claim 1, wherein the pressure bodies are plates.

4. The worm drive as claimed in claim 1, wherein the diaphragm spring device comprises two diaphragm springs.

5. The worm drive as claimed in claim 1, wherein the diaphragm spring device is combined with a spring holder which has an axial stop body for the diaphragm spring device.

6. The worm drive as claimed in claim 5, wherein the spring holder comprises a spacer that extends through the diaphragm spring device from the stop body and, with a free end, forms a stop for the pressure body to which the diaphragm spring device is assigned.

7. An adjusting device having a worm drive as claimed in claim 1.

8. A motor vehicle having an adjusting device as claimed in claim 7.

9. The worm drive as claimed in claim 1, wherein the diaphragm spring device applies a compensating force on another face of one of the pressure bodies.

10. The worm drive as claimed in claim 1, wherein the entirety of the worm shaft is rotatably mounted between the pressure bodies.

11. The worm drive as claimed in claim 1, wherein the worm shaft is an elongate body extending in the axial direction from a first shaft end at a first outermost portion to a second shaft end at a second outermost portion, wherein the shaft ends comprise the first shaft end and the second shaft end, and wherein the outermost portions comprise the first outermost portion and the second outermost portion.

12. The worm drive as claimed in claim 1, wherein the each of the shaft ends are rotatably mounted in a housing via sliding bearings.

* * * * *